May 6, 1941.　　　　M. KLAVÍK　　　　2,241,038
CHASSIS OF REAR-ENGINED VEHICLES
Filed Feb. 21, 1940
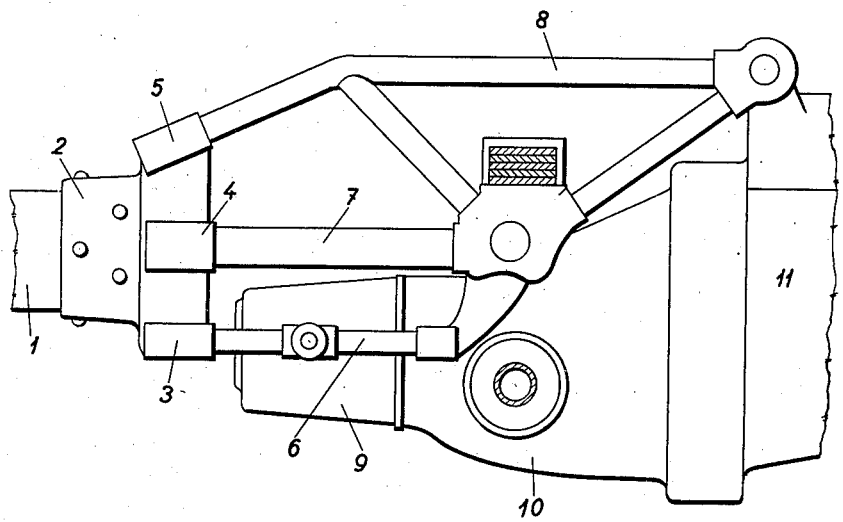

Patented May 6, 1941

2,241,038

UNITED STATES PATENT OFFICE 2,241,038

CHASSIS OF REAR-ENGINED VEHICLES

Miloš Klavík, Prague-Smichov, Czechoslovakia

Application February 21, 1940, Serial No. 320,198
In Czechoslovakia June 21, 1938

2 Claims. (Cl. 180—54)

The present invention relates to chassis of rear engined vehicles.

In vehicles having the engine disposed at the rear the main chassis part often consists of a main central chassis member of hollow construction which is formed either as a drawn tube of circular cross section or as a welded frame member of rectangular cross section. The rear end of this chassis member is usually constructed as a fork with arms between which the engine, gear box and the axle drive are resiliently mounted or suspended.

This arrangement of the central chassis member has the drawback that it is necessary to form the chassis of a number of parts which are connected with each other by welding, which necessitates very careful work and subsequent annealing in order to eliminate completely all the internal stresses which have been arising owing to the welding.

According to the invention, this difficulty is eliminated in that the fork end or supporting framework for the suspension of the driving unit and the main chassis member are separately constructed and are connected with each other by an intermediate connecting member which is preferably of cast or forged construction. The connection of these two parts can be carried out by riveting, screwing or the like. In addition, the connecting members can conveniently be so constructed that it can carry more than the two fork arms, whereby there is obtained the possibility of separately mounting each part of the driving unit of the vehicle to suit the shape and the desired relative dispositions of the appropriate parts of the driving unit.

One object of the invention therefore is to provide a chassis for a rear-engined vehicle, including a main central chassis member and a supporting framework for the driving unit in which the said main chassis member and said supporting framework are formed separately from one another and are connected together by an intermediate connecting member.

A further object is to provide a chassis, including a main central chassis member and a supporting framework for the driving unit in which the said main central chassis member and said supporting framework are formed separately from one another and are connected together by an intermediate cast or forged connecting member.

A still further object is to provide, in a chassis for a rear engined vehicle, a main central chassis member, an intermediate connecting member secured to said chassis member and embodying sockets, and a supporting framework including frame elements which engage in said sockets for connection thereof to the intermediate connecting member and thus to the main chassis member.

An example of the construction of the invention is illustrated diagrammatically in the accompanying drawing.

A main central chassis member 1 of tubular construction is provided at its rear end with an intermediate connecting member 2, which is riveted on and which has at its other side tubular sockets or extensions 3, 4 and 5 in which the tubular carrier elements 6, 7 and 8 of the supporting framework are inserted and secured, for instance by riveting. These carrier elements can in turn be so braced relative to each other by means of ties and/or struts that a very powerful framework of small weight is obtained. On a framework so disposed there are then mounted the separate parts of the driving unit of the vehicle, i. e. the gear box 9, the axle driving gear 10 and the engine 11.

Suitable resilient pads or cushioning devices may be interposed between the engine and the supporting framework and if desired, also between the remainder of the driving unit and the supporting framework.

I declare that what I claim is:

1. In a chassis for a rear-engined vehicle, a main central chassis member, an intermediate connecting member secured to said chassis member and embodying sockets, and a supporting framework including frame elements which engage in said sockets for connection thereof to the intermediate connecting member and thus to the main chassis member.

2. In a chassis for a rear-engined vehicle, an intermediate connecting member embodying sockets, a main central chassis member engaging at its rear end in one of the sockets of said intermediate connecting member, and a supporting framework for the driving unit of the vehicle, including elements which engage in other sockets of the connecting member whereby the supporting framework is connected to the main chassis member.

MILOŠ KLAVÍK.